A. ROSCETTA.
HOSE CLAMP.
APPLICATION FILED JUNE 20, 1918.
1,288,204.
Patented Dec. 17, 1918.
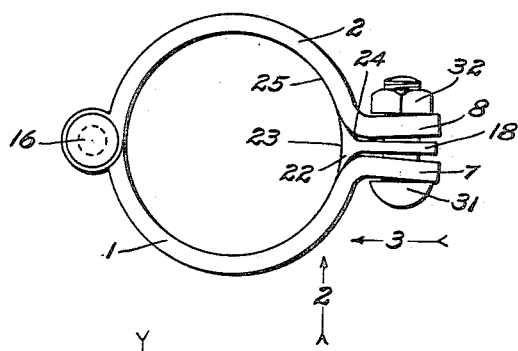
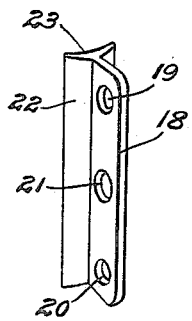
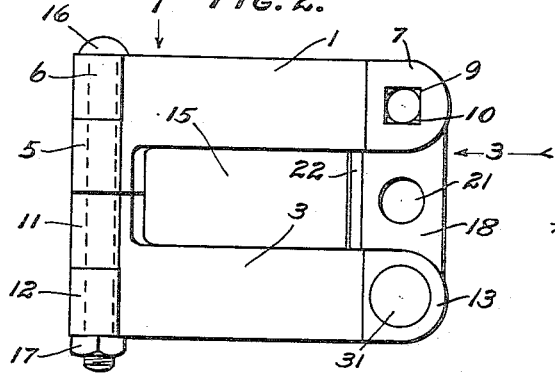
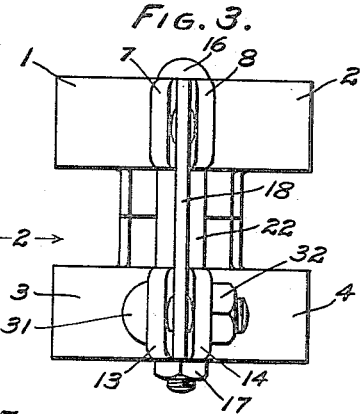
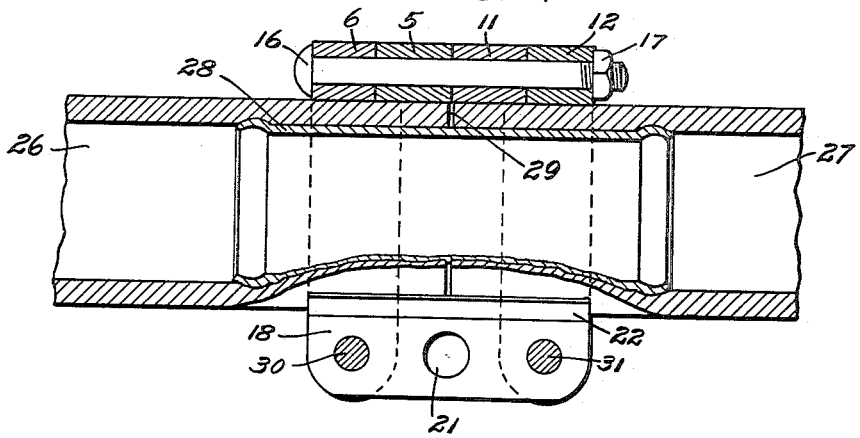
INVENTOR
ANTONIO ROSCETTA
BY Hazard & Miller
ATT'YS.

UNITED STATES PATENT OFFICE.

ANTONIO ROSCETTA, OF JEROME, ARIZONA.

HOSE-CLAMP.

1,288,204.  Specification of Letters Patent.  Patented Dec. 17, 1918.

Application filed June 20, 1918. Serial No. 241,059.

*To all whom it may concern:*

Be it known that I, ANTONIO ROSCETTA, a citizen of the United States, residing at Jerome, in the county of Yavapai and State of Arizona, have invented new and useful Improvements in Hose-Clamps, of which the following is a specification.

My invention relates to hose clamps and consists in the novel features herein shown, described and claimed.

Figure 1 is an end elevation of a hose clamp embodying the principles of my invention, as seen looking in the direction indicated by the arrow 1 in Fig. 2.

Fig. 2 is a plan view looking in the direction indicated by the arrows 2 in Figs. 1 and 3.

Fig. 3 is an edge view, as indicated by the arrows 3 in Figs. 1 and 2.

Fig. 4 is a perspective of the removable connecting link.

Fig. 5 is a longitudinal central section showing the hose clamp used as a coupling.

The clamping members 1, 2, 3 and 4 are substantially alike and each member is semi-circular or concavo-convex and adapted to reach one-half of the way around a hose to which the clamp is to be applied.

The clamping member 1 has a hinge member 5 and the clamping member 2 has a hinge member 6, said hinge members 5 and 6 being off-set so as to bring the clamping members 1 and 2 into a transverse line. Clamping ears 7 and 8 extend from the ends of the clamping members 1 and 2 opposite the hinge members 5 and 6. One of the ears 7 and 8 has a square bolt holt 9 and the other ear has a round bolt hole 10. In a like manner the clamping members 3 and 4 have hinge members 11 and 12 and clamping ears 13 and 14, one ear having a square hole and the other a round hole. The hinge members 5 and 11 extend toward each other from the clamping members 1 and 3 so as to form a space 15. A hinge bolt 16 extends through the hinge members 6, 5, 11 and 12, and a nut 17 mounted upon the end of the bolt holds the four hinge members together, so that each clamping member 1, 2, 3 and 4 may swing upon the bolt 16 freely and independently of the others.

The removable link 18 has a bolt hole 19 in one end and a bolt hole 20 in the other end and a central opening 21. The link 18 fits between the ears 7 and 8 and 13 and 14 and the bolt hole 19 lines up with the holes 9 and 10 in the ears 7 and 8 and the bolt hole 20 lines up with the holes in the ears 13 and 14. A metal pad 22 extends from the inner edge of the link 18 and has a curved inner surface 23, so that the pad 22 will fill the wedge-shaped opening 24 formed by bending the clamping ears outwardly from the ends of the clamping members, and so that the face 23 will match with the inner faces 25 of the clamping members to make a complete circle.

When it is desired to connect a piece of hose 26 to a second piece of hose 27 an inner tubular coupling 28 is inserted into the meeting ends of the hose, said coupling extending substantially equal distances inside of the hose each side of the joint 29 formed by the meeting ends of the hose and then the clamp is applied so that the two members 1 and 2 will be on one side of the joint 29 and the other two members 3 and 4 will be on the other side of the joint. Then the link 18 is inserted between the clamping ears and bolts 30 and 31 are inserted through the mating ears, said bolts being preferably carriage bolts having square shanks under their heads to fit the square holes and round studs extending from the shanks to fit the round holes and receive the nuts 32. When the nuts are tightened to draw the ears against the link 18 the clamping members 1 and 2 will grip the hose on one side of the joint 29 and the clamping members 3 and 4 will grip the hose on the other side of the joint, the points of contact being spaced from the joint equal to half the distance of the space 15. In a like manner the clamp may be used to connect a nozzle or the like to one end of a hose.

The opening 21 forms a convenient means for engaging a nail or hook to hang the hose up.

Various changes may be made without departing from the spirit of my invention as claimed.

I claim:

1. A hose clamp comprising a pair of clamping members, hinge members extending from corresponding ends of the clamping members, clamping ears extending from the other ends of the clamping members, a second pair of clamping members, hinge members extending from corresponding ends of the second pair of clamping members, clamping ears extending from the other ends of the second clamping members, means for spacing the two pairs of clamping members apart, a hinge pin inserted through the four hinge members so as to connect the two pairs of clamping members together and so that each clamping member may swing independent of the others, a link between the two pairs of clamping ears, a bolt inserted through the first pair of clamping ears and through one end of the link, and a second bolt inserted through the second pair of clamping ears and through the other end of the link.

2. A hose clamp comprising a pair of clamping members, hinge members extending from corresponding ends of the clamping members, clamping ears extending from the other ends of the clamping members, a second pair of clamping members, hinge members extending from corresponding ends of the second pair of clamping members, clamping ears extending from the other ends of the second clamping members, means for spacing the two pairs of clamping members apart, a hinge pin inserted through the four hinge members so as to connect the two pairs of clamping members together and so that each clamping member may swing independent of the others, a link between the two pairs of clamping ears, a pad extending from the inner edge of the link and having an inner face adapted to match with the inner faces of the clamping members, a bolt inserted through the first pair of clamping ears and through one end of the link, and a second bolt inserted through the second pair of clamping ears and through the other end of the link.

In testimony whereof I have signed my name to this specification.

ANTONIO ROSCETTA.